US007680074B2

(12) United States Patent
Xu et al.

(10) Patent No.: US 7,680,074 B2
(45) Date of Patent: Mar. 16, 2010

(54) METHOD AND APPARATUS FOR OPTIMIZING CELL OPERATION TOWARD BETTER SPEECH QUALITY IN WIRELESS PACKET-SWITCHING NETWORKS

(75) Inventors: Xiaode Xu, Fremont, CA (US); David Sheldon Stephenson, San Jose, CA (US); Wenfeng Huang, San Ramon, CA (US); Huizhao Wang, San Jose, CA (US); Arnold Mark Bilstad, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1438 days.

(21) Appl. No.: 10/888,691

(22) Filed: Jul. 9, 2004

(65) Prior Publication Data

US 2006/0007878 A1 Jan. 12, 2006

(51) Int. Cl.
*G06F 15/16* (2006.01)

(52) U.S. Cl. ....................................... 370/328; 370/239

(58) Field of Classification Search ................. 370/328; 375/240; 382/239

See application file for complete search history.

(56) References Cited

U.S. PATENT DOCUMENTS 6,721,280 B1 4/2004 Mauro et al. ................ 370/252
6,785,262 B1 8/2004 Yao et al. .................... 370/352
7,251,691 B2 * 7/2007 Boyd et al. ................. 709/224
2002/0080871 A1 * 6/2002 Fallon et al. ................ 375/240
2005/0232309 A1 * 10/2005 Kavaler ...................... 370/519

FOREIGN PATENT DOCUMENTS

CN 1439155 A 8/2003

OTHER PUBLICATIONS

Office Action Issued by the State Intellectual Property Office of the People's Republic of China.

* cited by examiner

*Primary Examiner*—Sam Bhattacharya
(74) *Attorney, Agent, or Firm*—Brinks Hofer Gilson & Lione

(57) ABSTRACT

An apparatus and method for switching a mobile processing device from communicating over a wireless connection with a first base unit to a second base unit based upon latency. In accordance with this invention, the mobile processing device determines latency information for packets being transmitted over the wireless connection to and from a base unit. The latency information is compared to a threshold value. If the latency information is greater than the threshold value, the mobile processing device adjusts parameters of the wireless connection between the mobile processing device and the network.

72 Claims, 9 Drawing Sheets

100
131
130
110
120
112
123
115
106
105
108
118
107
109
111
121
113
122
116
117

METHOD AND APPARATUS FOR OPTIMIZING CELL OPERATION TOWARD BETTER SPEECH QUALITY IN WIRELESS PACKET-SWITCHING NETWORKS

FIELD OF THE INVENTION

This invention relates to wireless connections between a mobile processing device and base units connected to a network. More particularly, this invention relates to using the latency between generating and transmission of data to determine when to adjust a wireless connection between a mobile processing device and the network.

PRIOR ART

In today's society, mobile processing devices that communicate via a wireless connection are common. Some examples of mobile processing devices include, but are not limited to, laptops, cellular telephones, Personal Digital Assistants (PDAs), and handheld scanners. For purposes of this discussion, wireless communications include but are not limited to Radio Frequency (RF) signals, and infrared signals.

Typically, mobile processing devices communicate with other devices connected to a network over a wireless communication. One example of wireless communication network is a 802.11 Wireless Local Area Network (WLAN) system. A 802.11 WLAN system includes at least one base station connected to the network and mobile processing devices communicating with the base stations via a wireless communication. A particular mobile device transmits and receives messages with a particular base unit connected to the network. For purposes of this discussion, a base unit is a device that has at least one interface connecting the base unit to a network and at least one transceiver for providing wireless communication with mobile devices. In a 802.11 WLAN system, a mobile processing device selects a base unit for wireless communication based upon the strength of wireless signals and quality of wireless signals being transmitted between the mobile processing device and the base unit.

In a 802.11 WLAN system, a mobile processing device selects a base unit for wireless communication in the following manner. In the system, each base station has at least one antenna and transceiver that communicate via RF signals with mobile processing devices in a specified area. The specified area is typically called a cell. When a mobile processing device is activated, the mobile processing device detects RF signals in the frequencies of base stations. The mobile processing device then determines the signals that are the strongest and communicates with the base station sending signals that are the strongest and having the best quality.

The mobile processing device then monitors the signal strength and quality of packets received from the selected base station. When the signal strength and/or signal quality fall below a predetermined level, the mobile processing device performs the process of selecting another base station for communication.

Latency is a problem in some applications performed by a mobile processing device. For purposes of this discussion, latency may be the time between when data is ready to transmit and when the data is transmitted or latency may be measured as the time between transmission from one device and reception by another device. For example, latency is a problem in voice communications. When latency reaches a certain length, conversations over the wireless communication do not sound natural. The conversation has a delay that makes each party of the conversation wait to talk instead of being able to talk simultaneously. In 802.11 WLAN system, latency may arise from a particular base station being overloaded with network traffic for mobile processing devices communicating with the base station, causing a delay in the receiving and transmitting of signals. Thus, those skilled in the art desire a method to reduce latency in the transmission of data between mobile processing device and a base unit connected to a network for time sensitive applications.

SUMMARY OF THE INVENTION

The above and other problems are solved and an advance in the art is made by a wireless network that performs processes in accordance with this invention. In accordance with invention, a mobile processing device uses latency information to determine when parameters for a wireless connection must be changed to reduce the latency in transmissions. This allows applications that require data to be delivered in a certain time frame to adjust the parameters for communications over a wireless connection between a mobile processing device and a base station or to change the base unit that is communicating with a mobile device to assure that data is delivered in a timely matter. One application that can take advantage of this invention is a WLAN system. A mobile voice terminal can change parameters of the communication or change the base station communicating with the mobile voice terminal in order to minimize the latency of the voice data sent and received in order to improve voice quality of a connection.

In accordance with one exemplary embodiment of this invention, a mobile processing device determines whether latency information is greater than a threshold and switches from communicating with a first base unit to communicating with a second base unit. The mobile device may measure the latency of data that the mobile processing device is transmitting and compare the latency to the threshold. Alternatively, the mobile processing device may receive latency information for data being transmitted by the base unit and then compares the latency information from the base unit to the threshold.

In accordance with a second exemplary embodiment of this invention, a base unit changes the parameters of communications over the wireless connection in order to reduce latency. The parameters for media contention may be altered to favor a particular mobile processing device communicating with a base station to transmit data.

BRIEF DESCRIPTION OF THE DRAWINGS

The above and other features and aspects of this invention are set forth in the following Detailed Description and are shown in the following drawings.

DETAILED DESCRIPTION

Figure 1:
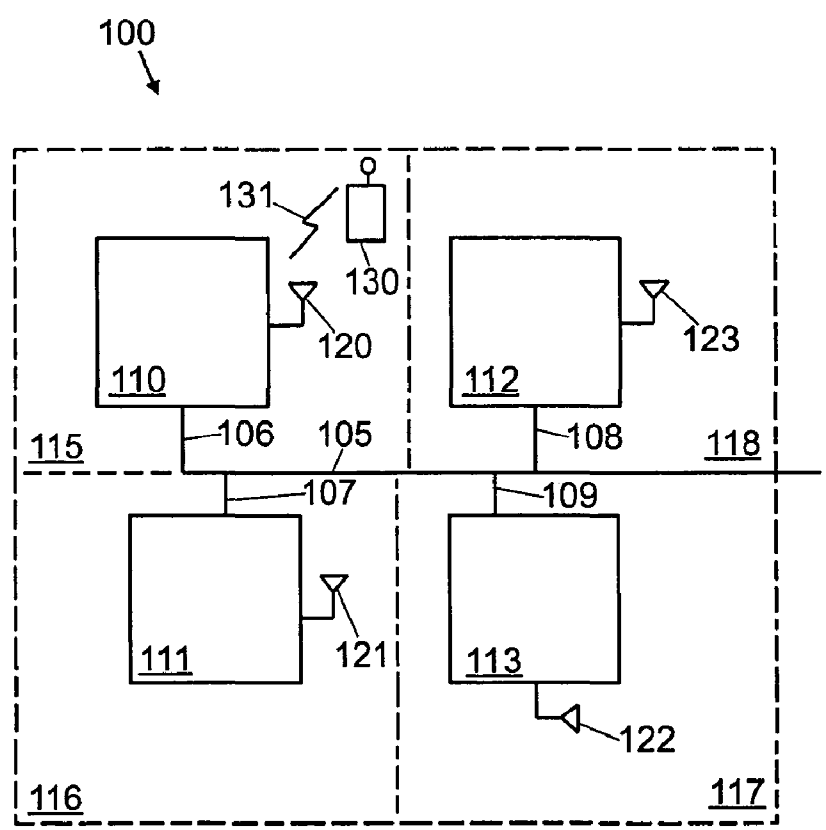
FIG. 1 illustrating a wireless local area network that is an exemplary embodiment of a network including a mobile device in accordance with this invention.

This invention relates to a mobile processing device that uses latency information to determine when to switch from communicating with a first base unit to communicating with a second base unit. This invention is described below in a manner that allows one skilled in the art to design and use a system in accordance with this invention. When possible, like reference numerals have been used in the accompanying figures to describe the same or like elements of this invention.

FIG. 1 illustrates an exemplary embodiment of a system in which mobile processing devices communicate with a network using a wireless connection in which the mobile process devices use latency to determine whether to switch communications from a first base unit to a second base unit in accordance with the present invention. Network 100 is a portion of a wireless Internet Protocol (IP) telephone network. One skilled in the art will recognize that although a 802.11 WLAN network is shown that this invention may be performed in any packet switched network where mobile processing devices are connected to a network via a wireless interface with a node herein referenced as a base unit.

In network 100, each base station 110-113 includes an antenna 120-122. Each base station 120-122 communicates with mobile processing devices in an area 115-117 commonly called a cell. For purpose of this discussion base station is used. However the term access point or AP are also commonly used. One skilled in the art will recognize that one cell may overlap with one or more adjacent cells depending on the exact configuration of the cell.

Each base station 110-113 connects to network 105 via path 106-109 to allow communication between devices connected to the network and mobile processing device communicating with base station 110. For example, in FIG. 1, mobile processing device 130 is in sector 115 and communicates with base station 110 over Radio Frequency (RF) signals 131 transmitted and received by antenna 120.

Although shown as exclusive units in FIG. 1 sectors 115-117 often overlap. Furthermore sectors from other base stations may overlap sectors 115-117. Therefore, mobile processing device 130 must select a sector of an antenna 120-123 for communication. Typically, mobile processing device 130 receives signals from all antennas 120-123 that serve overlapping sectors including the position of mobile processing device 130. Mobile processing device 130 then measures the signal strength and signal quality of the RF signals received from each antenna and selects the sector of the antenna with the strongest signals and quality of signals.

During communication, mobile processing device 130 monitors the received RF signals. When the RF signal strength and/or quality drop below a certain threshold, mobile processing device 130 selects another sector for communication. In accordance with this invention, a mobile processing device provides a time sensitive application, such as voice or video plus voice conversations. Thus, a mobile processing device also monitors the latency in signals in an upstream and downstream communication to determine when the latency exceeds a certain threshold that affects conversations. When the latency reaches a threshold, mobile telephone 130 executes the process of selecting a new sector for communication.

Figure 2:
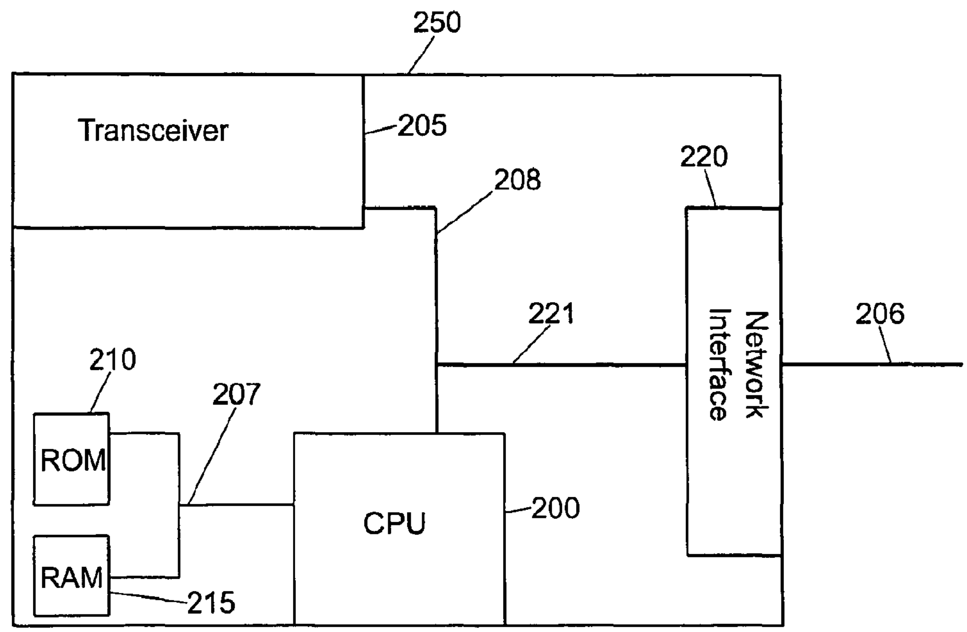
FIG. 2 illustrating a block diagram of components of a base unit in accordance with an exemplary embodiment of this invention.

FIG. 2 illustrates hardware components in a base station 250 needed to measure latency in accordance with this invention. One skilled in the art will recognize that each base unit 110-113 shown in FIG. 1 include the components of base station 250. Base station 250 includes a Central Processing Unit (CPU) 200. CPU 200 is processor, microprocessor, or combination of processors and/or microprocessors that execute instructions stored in a memory to perform applications required to perform the services of base station 250. CPU 200 is connected to Read Only Memory (ROM) 210 and Random Access Memory (RAM) 215 via memory bus 207. ROM 210 is any type of nonvolatile memory that stores configuration information and/or application instructions for base station 250. RAM 215 is a volatile memory that stores data and instructions for applications performed by base station 110. CPU 200 connects to an IP network through interface 220 via path 221. Network interface 250 allows base station 250 to receive data from and transmit data to the IP network via path 206.

CPU connects to transceiver 205 via bus 208. Transceiver 205 connects to an antenna to transmit data to and receive data from mobile processing devices in a given sector. Transceivers 205 includes a buffer that stores data packet to be transmitted in a queue until the packets are transmitted. Transmission maybe performed in any number of schemes that are not important to this discussion and omitted for brevity.

Figure 3:
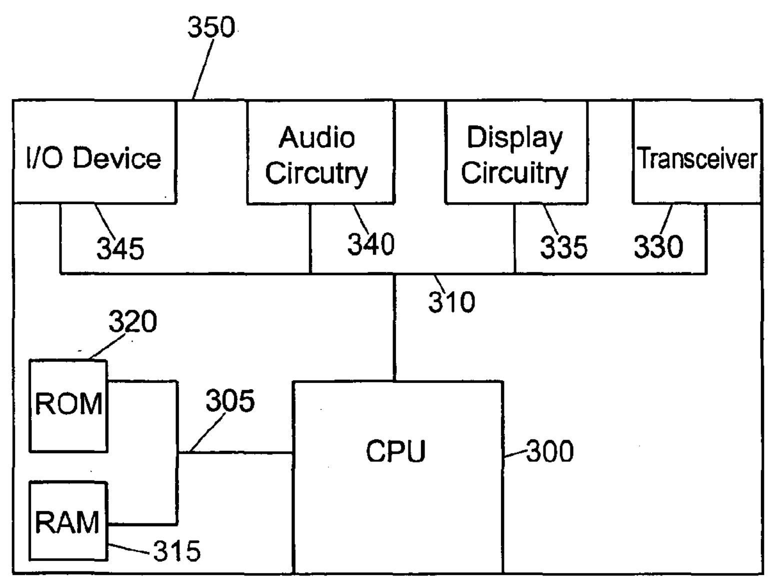
FIG. 3 illustrating a block diagram of components of a mobile handset in accordance with an exemplary embodiment of this invention.

FIG. 3 illustrates a block diagram of mobile handset 350 that may be a mobile processing device 130 providing voice communications. One skilled in the art will recognize other mobile devices such as PDAs, laptop computers, hand-held scanners, and other wireless processing devices may use the processes in accordance with this invention. Mobile handset 350 includes a CPU 300. CPU 300 is a processor, microprocessor, or combination of processors and/or microprocessor that execute instructions stored in a memory to perform applications required to perform the services of mobile handset 350. CPU 300 is connected to Read Only Memory (ROM) 320 and Random Access Memory (RAM) 315 via memory bus 305. ROM 320 is any type of non-volatile memory that stores configuration information for the mobile handset 350. RAM 315 is a volatile memory that stores data and instructions for applications performed by mobile handset 350.

CPU 300 is connected to I/O device 345, audio circuitry 340, display circuitry 335, and transceiver 330 via Input/Output (I/O) bus 310. I/O device includes circuitry for receiving input from a user. I/O device 345 may include a keyboard, touchpad, scroll bar, dial, or other device for allowing a user to input data. The exact configuration is typically well known and not important to the present invention. Therefore, a precise discussion of I/O device 345 is omitted for brevity.

Audio circuitry 340 includes all of the circuitry including microphones and amplifiers for playing and receiving audio data. Audio circuitry 340 receives analog sound data from a microphone and converts the data to a digital signal. Audio circuitry receives digital data from bus 310 and converts the data to an analog signal applied to the audio equipment to play sound. One skilled in the art will recognize that that the configuration of audio circuitry 340 is not related to the present application and a detailed description is omitted for brevity.

Display circuitry 335 includes circuitry needed to provide alphanumeric data on a Liquid Crystal Display (LCD) or other type of screen. Display circuitry 335 receives signals from CPU 300 via bus 310 and displays the data on the screen. The exact configuration of display circuitry is typically well known and not important to this invention. Therefore, a precise description is omitted for brevity.

Transceiver 330 is connected to an antenna to send and receive wireless signals. For purposes of the present invention wireless signals may include RF signals, infrared signals or any other form of wireless communications. Transceiver circuitry 330 may include circuitry for converting received analog signals to digital data and circuitry for converting digital data from the CPU to analog signals. Transceiver circuitry 330 may also include buffer 331. Buffer 331 stores data packets received from CPU 300 until transceiver 330 can transmit the packet. One skilled in the art will recognize that exact configuration of transceiver circuitry is not important to this invention and is omitted for brevity.

The present invention relates to determining the latency between the time that a packet is ready for transmission in a transmitting device and the reception of the packet in a receiving device. One skilled in the art will appreciate that latency may be measured in either the downstream (base unit to mobile device direction) or upstream (mobile device to base unit) direction. The latency is then used to determine when wireless communication parameters may be changed to reduce latency. Latency of transmission is important in some time sensitive applications such as voice communications where a conversation may not seem natural when the latency is too great. In order to determine latency of transmissions between a base unit and a mobile processing, internal clocks in the base unit and the mobile processing device may have to be synchronized. Most wireless communication systems, such as a 802.11 WLAN system, already provide a protocol for synchronization of an internal clock in a mobile processing device and an internal clock of a base unit when a wireless connection is established.

Figure 4:
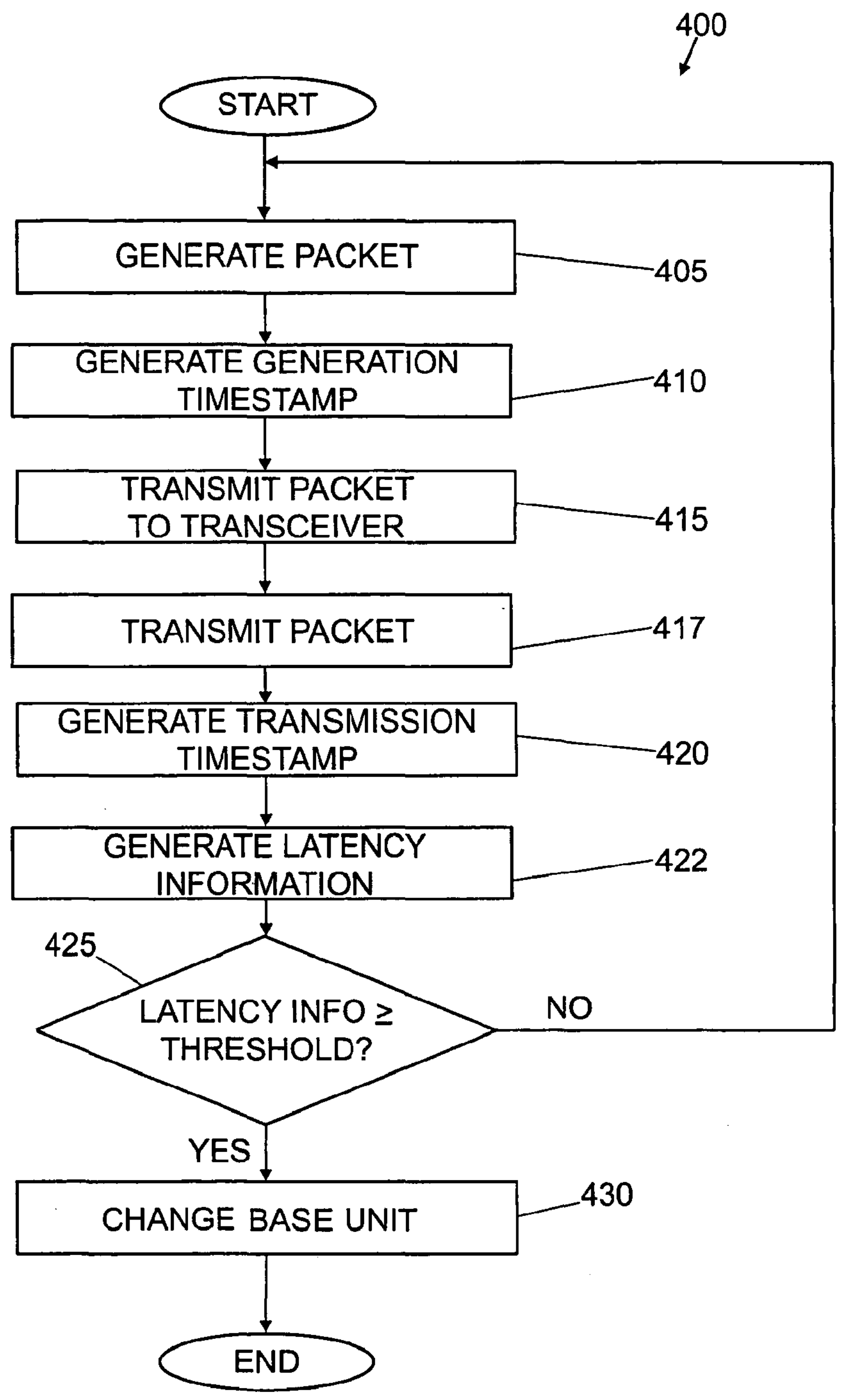
FIG. 4 illustrating a flow diagram of a first process for switching bases stations by a mobile processing device in accordance with an exemplary embodiment of this invention.

FIG. 4 illustrates an exemplary embodiment of a process 400 which is executed by a mobile processing device to use latency for a determination of when communications should be switched from a first base unit to a second base unit. Process 400 begins in step 405 when a packet is generated in the mobile device. In step 410, a generation time stamp of when the packet was generated is stored. The generation time stamp may be inserted in the packet or may be stored in a memory in the mobile processing device. In step 415, the packet is then transmitted to a transceiver in the mobile processing device. Typically, the packet is stored in a buffer in the transceiver when received. The data packet is then transmitted by the transceiver in step 417.

In response to transmitting the packet, a transmission time stamp is generated in step 420. The transmission time stamp is then compared to the generation time stamp to generate latency information. Latency information may be the difference between the two time stamps. One skilled in the art will recognize that an alternative embodiment may include generating latency information for a predetermined number of packets and determining an average of the latency information. In another alternative embodiment, jitter may be used. Jitter is the average or a minimum latency subtracted from the latency of a particular packet.

In step 425, the latency information is compared to a latency threshold. For voice communications, the latency threshold is typically in a range of 0 milliseconds to 50 milliseconds. The exact threshold is determined by the particular application and the exact requirements of the designer. If the latency information is less than the threshold, the process is repeated from step 405 for another packet. If the latency information is greater then the threshold, the mobile processing device executes the process for changing to another base unit. For example, an 802.11 mobile handset executes the process for selecting another cell or base unit for wireless communications. This process may be the process currently used to determine the cell for communication.

Figure 5:
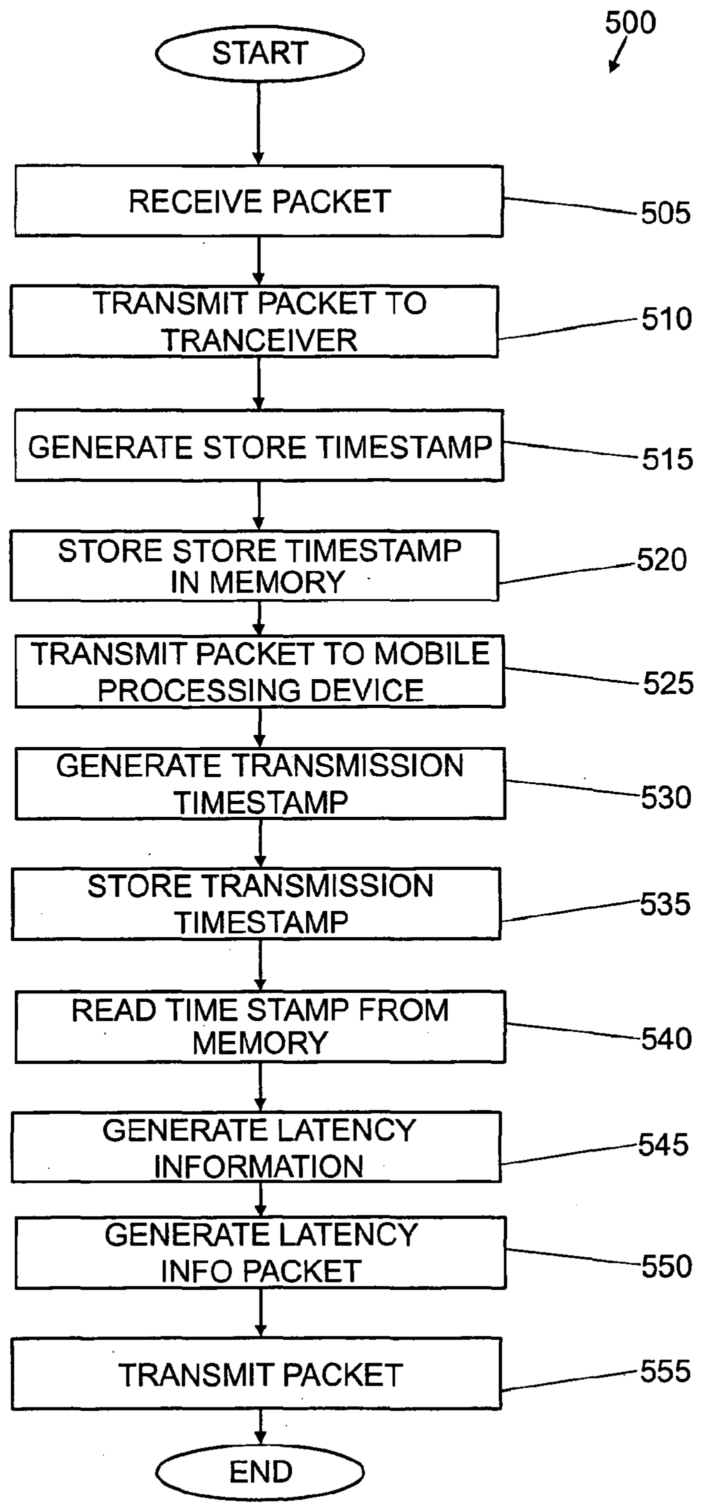
FIG. 5 illustrating a flow diagram of a first process performed by a base station in order to provide latency information to a mobile processing device in accordance with an exemplary embodiment of this invention.
Figure 6:
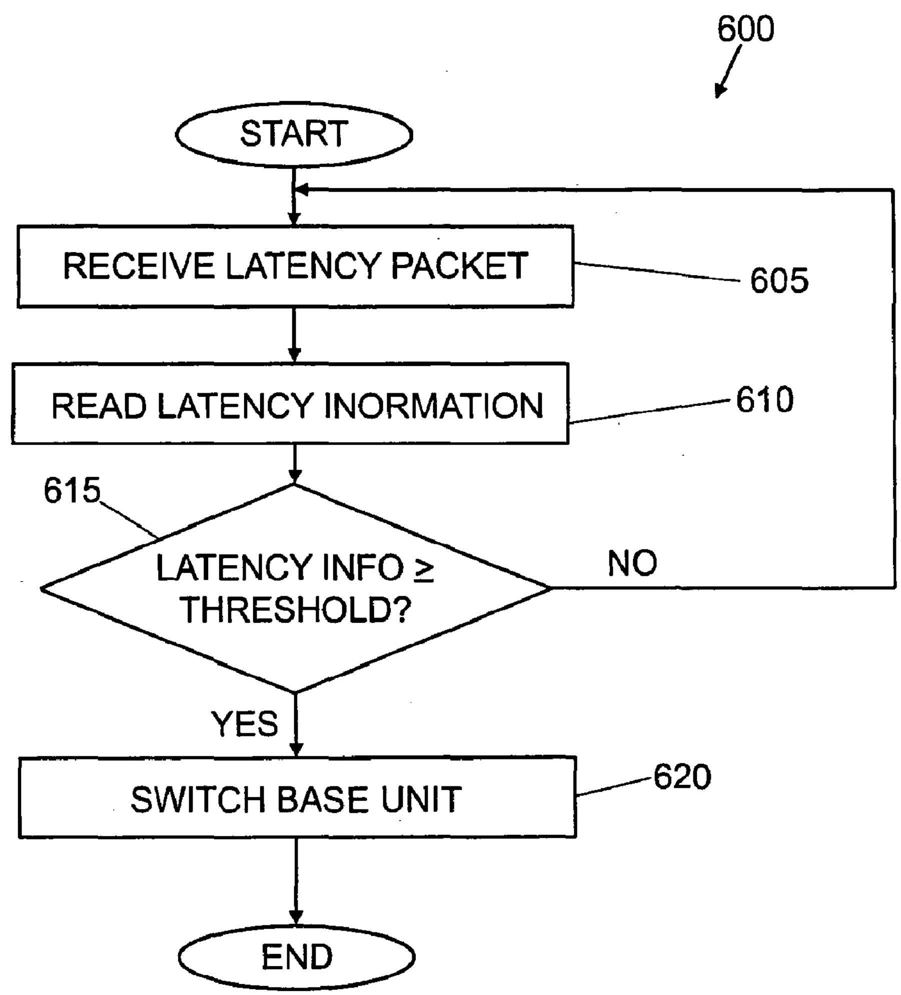
FIG. 6 illustrating a flow diagram of a process performed by a mobile processing device to switch base units in accordance with an exemplary embodiment of this invention.

FIGS. 5 and 6 illustrate an exemplary process in which the mobile processing device determines the latency of data sent from the base unit to the mobile processing device. FIG. 5 illustrates a process 500 executed by a base unit to produce the information. FIG. 6 illustrates a process 600 executed by a mobile processing device to determine latency of the transmission of data from the base unit based upon the information from the base unit.

Process 500 begins in step 505 with a packet received from the wire net for the base unit to transmit. In step 510, the processor or circuitry in base unit transmits the received packet to the proper transceiver for transmission. In response to transmitting the packet to the transceiver, a store time stamp is generated in step 515. The store time stamp is then stored in a memory in the base unit in step 520. Alternatively, the time stamp is inserted into the packet being transmitted for use by the mobile handset to determine latency. The transceiver then transmits the packet in step 525.

In response to transmitting the packet, the transceiver generates a transmission time stamp in step 530. The transmission time stamp is stored in a memory in the base unit in step 535.

Figure 7:
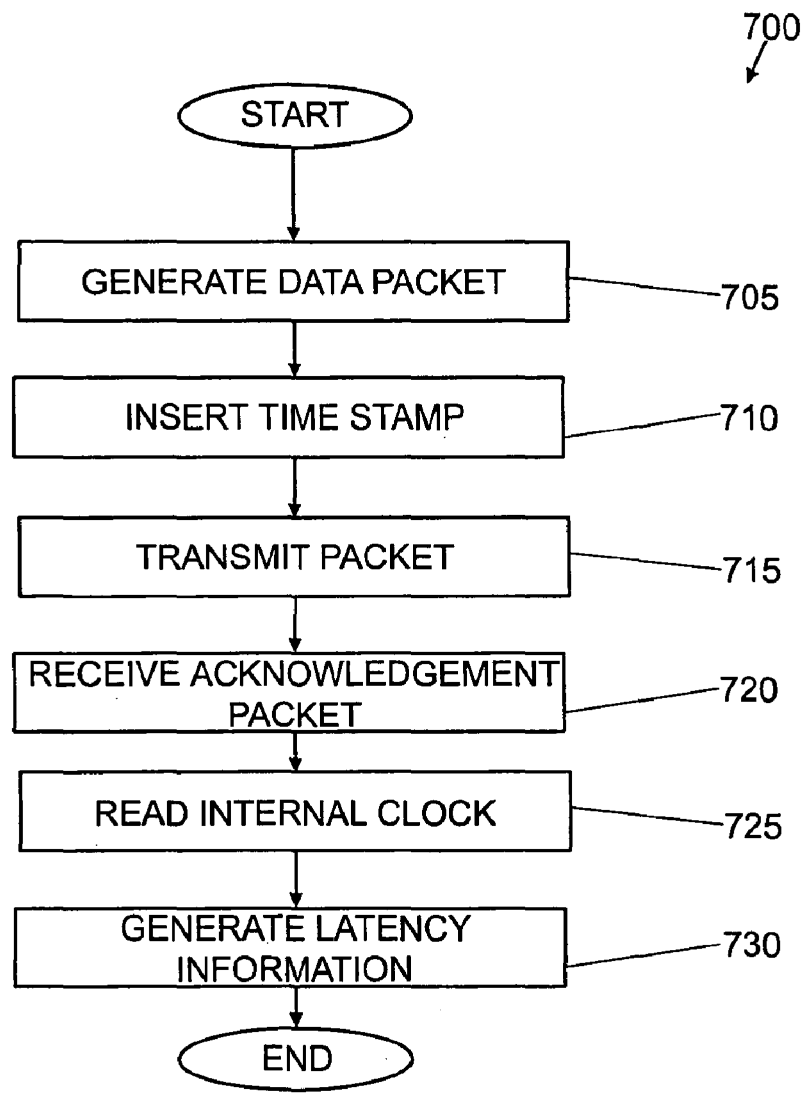
FIG. 7 illustrating a flow diagram of a process performed by a transmitting device to measure latency in accordance with a second exemplary embodiment of this invention.

In order to transmit this information to a mobile processing device, a processor in the base unit reads the store time stamp and transmit time stamp from the memory in step 540. In step 545, the latency information is generated. The latency information may be the data of both time stamps or the difference of the time stamps. Alternatively, the store time stamp may be used and the time that an acknowledgement message for the packet is received from the mobile processing device. The difference between the store time and time of acknowledgement message represents the latency. In other alternative embodiments, the store and transmit times stamps from a predetermined number of packets may be used to determine an average latency which will be the latency information as shown in FIG. 7 and described below.

In step 550, a packet including the latency information is generated. The packet may be a packet including control data that is routinely transmitted to the mobile processing device or may be a specified packet for transmitting the latency information. In step 555, the packet is transmitted to the mobile processing device and process 500 ends.

Process 600 is an exemplary embodiment of a process executed by a mobile processing device to determine whether the latency of packets sent from a base unit surpasses a latency threshold. Process 600 begins in step 605 with the mobile processing device receiving a latency packet. The latency packet may be a packet for specifically transmitting latency information or a control packet that includes other information for maintaining a wireless transmission.

In step 610, the latency information is read from the packet. The latency information may be the store and transmit time stamps in which case the latency information must be generated from the time stamp. Alternatively, the latency information has been calculated by the base unit and transmitted to a mobile processing device. In step 615, the latency information is compared to a latency threshold. If the latency information is less than the threshold, process 600 returns to step 605 to receive another packet. If the latency information is greater than the threshold, a switch base unit process is executed in step 620. The switching processing may be the switching process that is standard in the art.

Figure 10:
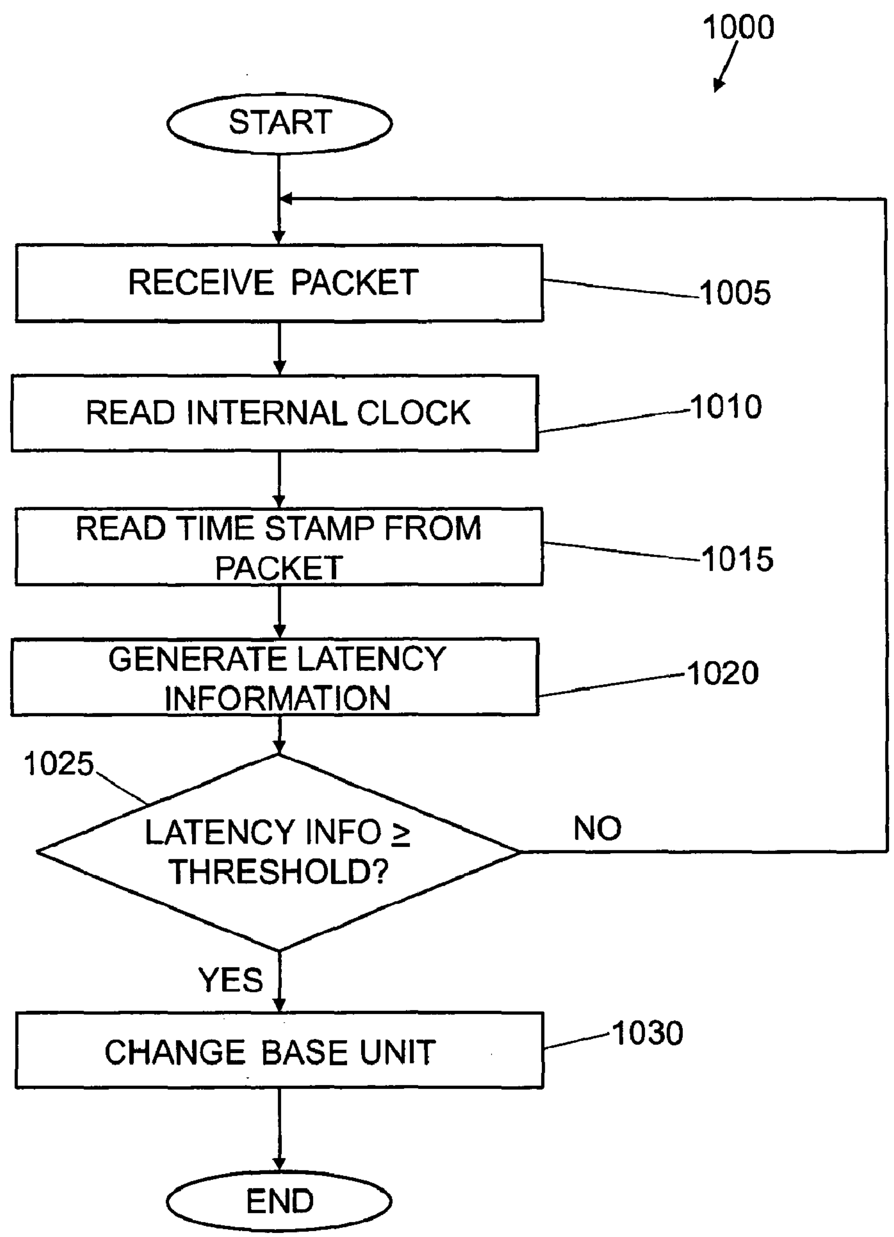
FIG. 10 illustrates an alternative exemplary embodiment in which time stamps and an internal clock of a device are used to determine latency.

FIG. 10 is an alternative embodiment in which a time stamp is inserted in the transmitted packet. Process 1000 begins in step 1005 with the mobile processing device receiving the packet. In step 1010, the time of an internal time clock is read responsive to receiving the packet. The time stamp is read from the packet in step 1015.

The time stamp is then subtracted from the time read from the internal clock in step 1020 to determine the latency information. One skilled in the art will recognize that this information may be added to the latency of other packets and an average latency is determined or may be used alone. In step 1025, the determined latency information is compared to a threshold value. If the latency is less than the threshold in step 1025, process 1005 is repeated from step 1005 when another packet is received. If the latency information is greater than or equal to the threshold value, a process for selecting a second base unit for wireless communication is performed in step 1030 and process 1000 ends.

Figure 8:
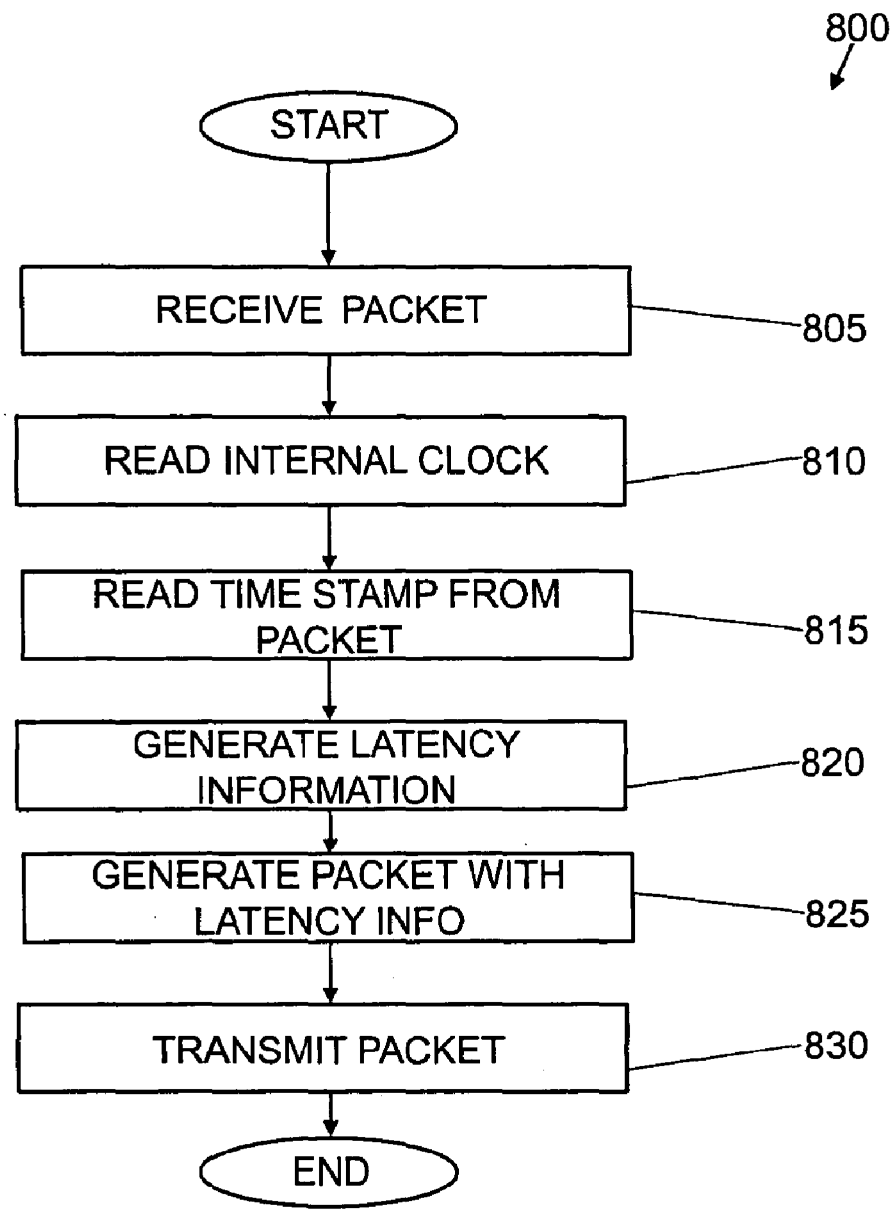
FIG. 8 illustrating a flow diagram of a process performed by a receiving device to measure latency in accordance with the second exemplary embodiment of this invention.
Figure 9:
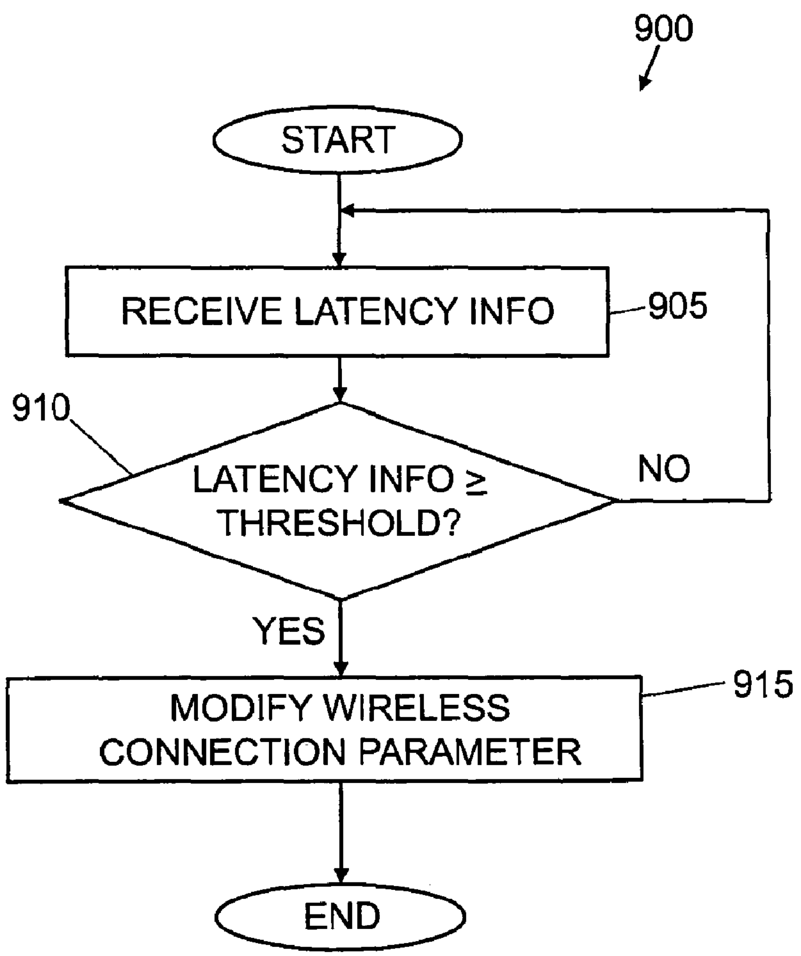
FIG. 9 illustrating a flow diagram of a process performed by a base unit to adjust parameters in accordance with a second exemplary embodiment of this invention.

FIGS. 7-9 illustrate an alternative embodiment of this invention in which a base unit modifies transmission parameters when latency is greater than a threshold in order to reduce the latency. FIG. 7 illustrates a process executed by a transmitting device in accordance with this alternative embodiment of this invention. One skilled in the art will recognize that either the mobile processing device or base unit may be the transmitting device depending upon whether the latency being measured is the downstream latency, i.e. latency in transmission from a base unit to a mobile processing device or is the upstream latency, i.e. latency in transmissions from the mobile processing device to the base unit. FIG. 8 illustrates a process executed by a receiving device to determine latency in accordance with this alternative embodiment of this invention. As noted above, the receiving device may be either the mobile processing unit or the base unit. Finally, FIG. 9 illustrates a process executed by a base unit to determine whether to modify.

Process 700, illustrated in FIG. 7, is an exemplary embodiment of steps performed in a transmitting device in this system in order to allow a receiving device to calculate latency of data being received. In order for process 700 to be implemented, the base unit must synchronize a clock or timer in a mobile processing device with a clock or timer maintained by the base unit when the mobile processing device establishes a wireless connection with the base unit. One skilled in the art will recognize that this process is performed by the base unit in down stream transmissions to a mobile processing device and by the mobile processing device in upstream transmissions. For example, the 802.11 standard includes a timing synchronization function (TSF) that may be used to synchronize clocks in a base unit and a mobile processing device communicating with the base unit.

Process 700 begins in step 705 when the transmitting device generates a data packet. In step 710, the transmitting device inserts a time stamp of the time maintained by the clock or timer into the packet. In step 715, the packet is transmitted from the transmitting device. In one exemplary embodiment, in which the receiving device measures latency, process 700 ends after step 715.

In a second exemplary embodiment, the transmitting device measures latency. In this exemplary embodiment, the transmitting device waits to receive an acknowledgement signal in step 720. The transmitting device reads the internal clock in the transmitting device at step 725 in response to receiving the acknowledgement packet. In step 730, the clock time read in step 725 is compared to the time stamp in the packet to determine the latency information and process 700 ends.

Process 800 is a process executed by the receiving device in these exemplary embodiments to determine latency. One skilled in the art will recognize that this process is performed in the mobile transmitting device to measure latency in downstream transmissions and in the base unit to measure latency in upstream transmissions.

Process 800 begins in step 805 by the receiving device receiving a packet. The receiving device reads an internal clock in step 810 to determine when the packet was received. In step 815, the receiving device may read the time stamp from the packet. In step 820, the receiving device generates latency information. The latency information may simply be the time read from the internal clock or may be the difference from the read time from the packet and the time read from the clock. Alternatively, the latency information may be generated by determining the average of latency for a multiple number of packets.

In step 725, the receiving device generates a packet with latency information. The packet may be an acknowledgement message or any other type of packet that includes control information. In step 730, the packet is transmitted and process 800 ends.

FIG. 9 illustrates a process 900 executed by the base unit once the latency information is determined in accordance with this exemplary embodiment of the invention. Process 900 begins in step 905 by receiving the latency information. The latency information may be determined by receiving of latency information from the mobile processing device or after the receiving of an acknowledgment message.

In step 910, the base unit compares the latency device to a threshold. As stated above, the latency threshold is typically between 40 to 50 milliseconds for voice applications. The exact latency time may be different for other processes such as streaming either audio or video data and other processes that require a minimal latency.

In step 915, the base unit determines if the latency is greater than the threshold. If the latency is less than the threshold, process 900 returns to step 905 to process data information from a different packet or a different group of packets. If the latency information is greater than the threshold, the base unit modifies transmission parameters for wireless connections. For example, in the 802.11e protocol for wireless voice communications, the base unit may adjust the persistence factor (PF), the minimum of the contention window termed the CW min, the maximum for the contention window termed Cwmax, and/or the arbitrated inter frame space termed AIFS. Alternatively, a hybrid coordination function in the base unit may be modified to allow more or less high priority data, such as voice, to be received from mobile processing devices. After the parameters are modified, process 900 returns to step 905 to process the latency for a subsequent packet or a subsequent group of packets.

The above is a description of exemplary embodiments operating in accordance with this invention. It is envisioned that those skilled in the art will construct alternatives that can and will infringe on this invention as set forth in the claims below either literally or through the doctrine of equivalents.

What is claimed is:

1. A method for adjusting a wireless connection between a mobile processing device and a network based upon latency, said method comprising:

determining latency information for data being transmitted between said mobile processing device and a first base unit;

comparing said latency information to a threshold value;

determining whether said latency information is greater than said threshold value responsive to said comparison; and adjusting said wireless connection between said mobile processing device and said network unit responsive to a determination that said latency information is greater than said threshold value.

2. The method of claim 1 wherein said latency information is an average of latency of a plurality of packets transmitted between said mobile processing device and said first base unit.

3. The method of claim 1 wherein said latency information is jitter of a packet transmitted between said mobile processing device and said first base unit.

4. The method of claim 1 wherein said network is a 802.11 wireless local area network.

5. The method of claim 1 wherein said step of adjusting said wireless connection comprises:

modifying a parameter of communication over said wireless connection to reduce latency.

6. The method of claim 5 wherein said step of adjusting said wireless connection further comprises:

modifying a plurality of parameters including said parameter of communication over said wireless connection to reduce latency.

7. The method of claim 5 wherein said step of modifying a parameter comprises:

changing the amount of time of a maximum contention window for transmitting data between said mobile processing device and said first base unit.

8. The method of claim 5 wherein said step of modifying a parameter comprises:

changing the amount of time of a minimum contention window for transmitting data between said mobile processing device and said first base unit.

9. The method of claim 8 wherein said first base unit changes the amount of time.

10. The method of claim 5 wherein said step of modifying said parameter comprises:

changing a persistence factor.

11. The method of claim 5 wherein said step of modifying said parameter comprises:

changing the amount of time for arbitration to occur.

12. The method of claim 11 wherein said step of changing the amount of time for arbitration comprises:

changing the length of time of an arbitrated interframe space.

13. The method of claim 5 wherein said step of modifying comprises:

prioritizing voice data from said mobile processing device over other types of data transmitted from said mobile processing device.

14. The method of claim 1 wherein said step of adjusting comprises:

switching said wireless connection of said mobile processing device from a first wireless connection between said mobile processing device and said first base unit to a second wireless connection between said mobile processing device and a second base unit.

15. The method of claim 14 wherein said step of determining said latency information comprises:

transmitting said data packet from said base unit to said mobile processing device.

16. The method of claim 15 where said step of determining said latency information further comprises:

generating a generation time stamp responsive to generating a data packet in said mobile processing device;

storing said generation time stamp in a memory of said mobile processing device;

generating a transmission time stamp responsive to transmitting said packet; and generating said latency information by determining a time difference between said generation time stamp and said transmission time stamp.

17. The method of claim 5 wherein said step of determining said latency information further comprises:

inserting a time stamp into said packet prior to transmitting said packet.

18. The method of claim 17 wherein said step of determining said latency information further comprises:

receiving said packet in said first base unit; reading said time stamp from said packet; and comparing said time stamp read from said packet to a time read from an internal clock maintained by said base unit.

19. The method of claim 17 further comprising:

synchronizing an internal clock in said mobile processing device with an internal clock in said first base unit.

20. The method of claim 17 wherein said step of determining said latency information comprises:

receiving latency information in said mobile processing device from said base unit.

21. The method of claim 20 further comprising:

generating said latency information in said base unit.

22. The method of claim 21 wherein said step of generating said latency information in said base unit comprises:

receiving a data packet in said base unit to transmit to said mobile processing device.

23. The method of claim 22 wherein said step of generating said latency information in said base unit further comprises:

inserting a time stamp in said packet; and transmitting said packet to said mobile processing device responsive to inserting said time stamp.

24. The method of claim 23 further comprising:

receiving said packet in said mobile processing device; reading said time stamp from packet; and comparing said time stamp to a time read from an internal clock to determine said latency information.

25. The method of claim 22 wherein said step of determining said latency information further comprises:

generating a received time stamp responsive to receiving said data packet;

storing said received time stamp in a memory in said base unit;

transmitting said data packet from said base unit to mobile processing device over a wireless connection;

generating a transmission time stamp responsive to transmitting said data packet; and storing said transmission time stamp in said memory in said base unit.

26. The method of claim 25 further comprising:

reading said received time stamp from memory;

inserting said received time stamp into a control packet;

reading said transmission time stamp from said memory;

inserting said transmission time stamp into said control packet; and transmitting said control packet from said base station to said mobile processing device.

27. The method of claim 26 wherein said step of determining said latency information comprises:

reading said received time stamp from said control packet in said mobile processing device;

reading said transmission time stamp from said control packet in said mobile processing device; and generating said latency information by determining a time difference between said received time stamp and said transmission time stamp.

28. The method of claim 26 further comprising:

reading said received time stamp from memory;

reading said transmission time stamp from said memory;

generating said latency information by determining a time difference between said received time stamp and said transmission time stamp;

inserting said latency information into a control packet; and transmitting said control packet to said mobile processing device from said base unit over said wireless connection.

29. The method of claim 28 wherein said step of determining said latency information comprises:

reading said latency information from said control packet.

30. The method of claim 1 wherein said threshold is in a range from about 0 milliseconds to about 50 milliseconds.

31. A mobile device that switches from communicating with a first base unit to communicating with a second base unit based upon latency, said mobile device comprising:

circuitry configured to determine latency information for data being transmitted between said mobile processing device and said first base unit;

circuitry configured to compare said latency information to a threshold value;

circuitry configured to determine whether said latency information is greater than said threshold value responsive to said comparison; and circuitry configured to switch to said second base unit responsive to a determination that said latency information is greater than said threshold value.

32. The mobile device of claim 31 wherein said circuitry configured to determine said latency information comprises:

circuitry configured to generate a generation time stamp responsive to generating a data packet in said mobile processing device;

circuitry configured to store said generation time stamp in a memory of said mobile processing device;

circuitry configured to transmit said data packet from said base unit to said mobile processing device;

circuitry configured to generate a transmission time stamp responsive to transmitting said packet; and circuitry configured to generate said latency information by determining a time difference between said generation time stamp and said transmission time stamp.

33. The mobile processing device of claim 31 wherein said circuitry configured to determine said latency information comprises:

circuitry configured to read a time stamp from a received packet;

circuitry configured to read a time from an internal clock in said mobile processing device; and circuitry configured to compared said time to said time stamp to determine said latency information.

34. The mobile process device of claim 31 wherein said circuitry configured to determine said latency information comprises:

circuitry configured to receive latency information in said mobile processing device from said base unit.

35. The mobile processing device of claim 34 wherein said circuitry configured to determine said latency information comprises:

circuitry configured to read a received time stamp from a control packet in said mobile processing device;

circuitry configured to read said transmission time stamp from said control packet in said mobile processing device; and circuitry configured to generate said latency information by determining a time difference between said received time stamp and said transmission time stamp.

36. The mobile processing device of claim 34 wherein said circuitry configured to determine said latency information comprises:

circuitry configured to read said latency information from said control packet.

37. The mobile processing device of claim 31 wherein said threshold is in a range from about 0 milliseconds to about 50 milliseconds.

38. An apparatus in a mobile processing device for switching a wireless connection with a first base unit to a wireless connection with a second base unit based upon latency, said apparatus comprising:

means for determining latency information for data being transmitted between said mobile processing device and said first base unit;

means for comparing said latency information to a threshold value;

means for determining whether said latency information is greater than said threshold value responsive to said comparison; and means for switching to said second base unit responsive to a determination that said latency information is greater than said threshold value.

39. The apparatus of claim 38 wherein said means for determining said latency information comprises:

means for generating a generation time stamp responsive to generating a data packet in said mobile processing device;

means for storing said generation time stamp in a memory of said mobile processing device;

means for transmitting said data packet from said base unit to said mobile processing device;

means for generating a transmission time stamp responsive to transmitting said packet;

means for generating said latency information by determining a time difference between said generation time stamp and said transmission time stamp.

40. The apparatus of claim 38 wherein said means for determining said latency information comprises:

means for receiving latency information in said mobile processing device from said base unit.

41. The apparatus of claim 40 wherein said means for receiving said latency information comprises:

means for reading a time stamp from a received packet;

means for reading a time from an internal clock in said mobile processing device; and means for comparing said time to said time stamp to determine said latency information.

42. The apparatus of claim 40 wherein said step of determining said latency information comprises:

means for reading said received time stamp from said control packet in said mobile processing device;

means for reading said transmission time stamp from said control packet in said mobile processing device; and means for generating said latency information by determining a time difference between said received time stamp and said transmission time stamp.

43. The apparatus of claim 38 wherein said means for determining said latency information comprises:

means for reading said latency information from said control packet.

44. The apparatus of claim 38 wherein said threshold is in a range from about 40 milliseconds to about 100 milliseconds.

45. A computer readable medium in a mobile processing device carrying one or more instructions for switching said mobile processing device from a wireless connection with a first base unit to a wireless connection with a second base unit, the one more instructions including instructions which executed by one or more processors, cause the one or more processors to perform the method comprising:

determining latency information for data being transmitted between said mobile processing device and said first base unit;

comparing said latency information to a threshold value;

determining whether said latency information is greater than said threshold value responsive to said comparison; and switching to said second base unit responsive to a determination that said latency information is greater than said threshold value.

46. The medium of claim 45 wherein said step of determining said latency information of said method comprises:

generating a generation time stamp responsive to generating a data packet in said mobile processing device;

storing said generation time stamp in a memory of said mobile processing device;

transmitting said data packet from said base unit to said mobile processing device;

generating a transmission time stamp responsive to transmitting said packet; and generating said latency information by determining a time difference between said generation time stamp and said transmission time stamp.

47. The medium of claim 45 wherein said step of determining said latency information of said method comprises:

receiving latency information in said mobile processing device from said base unit.

48. The medium of claim 47 wherein said step of determining said latency information comprises:

reading a time stamp from a received packet; reading a time from an internal clock in said mobile processing device; and comparing said time to said time stamp to determine said latency information.

49. The medium of claim 47 wherein said step of determining said latency information of said method comprises:

reading said received time stamp from said control packet in said mobile processing device;

reading said transmission time stamp from said control packet in said mobile processing device; and generating said latency information by determining a time difference between said received time stamp and said transmission time stamp.

50. The medium of claim 47 wherein said step of determining said latency information method comprises: reading said latency information from said control packet.

51. The medium of claim 45 wherein said threshold is in a range from about 0 milliseconds to about 50 milliseconds.

52. A base unit that connects to a mobile processing device over a wireless connection, said base unit comprising:

circuitry configured to determine latency information for data being transmitted between said mobile processing device and said base unit;

circuitry configured to compare said latency information to a threshold value;

circuitry configured to determine whether said latency information is greater than said threshold value responsive to said comparison; and circuitry configured to modify a parameter of communication over said wireless connection to reduce latency.

53. The base unit of claim 52 wherein said circuitry configure to modify a parameter comprises:

circuitry configured to change the amount of time of a minimum contention window for transmitting data between said mobile processing device and a first base unit.

54. The base unit of claim 53 wherein said circuitry configure to modify a parameter comprises:

circuitry configured to change the amount of time of a maximum contention window for transmitting data between said mobile processing device and a first base unit.

55. The base unit of claim 52 wherein said circuitry configured to modify said parameter comprises:

circuitry configured to change the amount of time for arbitration to occur.

56. The base unit of claim 55 wherein said circuitry configured to change the amount of time for arbitration comprises:

circuitry configured to change the length of time of an arbitrated interframe space.

57. The base unit of claim 52 wherein said circuitry configured to modifying comprises:

circuitry configured to prioritize voice data from said mobile processing device over other types of data transmitted between said mobile processing device and said base unit.

58. The base unit of claim 52 wherein said circuitry configured to determine said latency information comprises:

circuitry configured to receive a packet from said mobile processing device;

circuitry configured to read a time stamp from said packet; circuitry configured to read a time from an internal clock; and circuitry configured to compare said time to said timestamp to determine said latency information.

59. An apparatus in a base unit that connects to a mobile processing device over a wireless connection, said apparatus comprising:

means for determining latency information for data being transmitted between said mobile processing device and said base unit;

means for comparing said latency information to a threshold value;

means for determining whether said latency information is greater than said threshold value responsive to said comparison; and means for modifying a parameter of communication over said wireless connection to reduce latency.

60. The apparatus of claim 59 wherein said means for modifying a parameter comprises:

means for changing the amount of time of a minimum contention window.

61. The apparatus of claim 59 wherein said means for modifying a parameter comprises:

means for changing the amount of time of a maximum contention window.

62. The apparatus of claim 59 wherein said means for modifying said parameter comprises:

means for changing the amount of time for arbitration to occur.

63. The apparatus of claim 62 wherein said means for changing the amount of time for arbitration comprises:

means for changing the length of time of an arbitrated interframe space.

64. The apparatus of claim 62 wherein said means for modifying comprises:

means for prioritizing voice data from said mobile processing device over other types of data transmitted between said mobile processing device and said base unit.

65. The apparatus of claim 59 wherein said means for determining comprises:

means for receiving a packet from said mobile processing device;

means for reading a time stamp from said packet; means for reading a time from an internal clock; and means for comparing said time to said timestamp to determine said latency information.

66. A computer readable medium in a base unit carrying one or more instructions for modifying parameters of a wireless connection with a mobile processing device, the one more instructions including instructions which executed by one or more processors, cause the one or more processors to perform the method comprising:

determining latency information for data being transmitted between said mobile processing device and said base unit;

comparing said latency information to a threshold value;

determining whether said latency information is greater than said threshold value responsive to said comparison; and modifying a parameter of communication over said wireless connection to reduce latency.

67. The medium of claim 66 wherein said step of modifying a parameter comprises:

changing the amount of time of a minimum contention window for transmitting data between said mobile processing device and a first base unit.

68. The medium of claim 66 wherein said step of modifying a parameter comprises:

changing the amount of time of a maximum contention window for transmitting data between said mobile processing device and a first base unit.

69. The medium of claim 66 wherein said step of modifying said parameter comprises:

changing the amount of time for arbitration to occur.

70. The medium of claim 69 wherein said step of changing the amount of time for arbitration comprises:

changing the length of time of an arbitrated interframe space.

71. The medium of claim 66 wherein said step of modifying comprises:

prioritizing voice data from said mobile processing device over other types of data transmitted between said mobile processing device and said base unit.

72. The medium of claim 66 wherein said step of determining comprises:

receiving a packet from said mobile processing device; reading a time stamp from said packet;

reading a time from an internal clock; and comparing said time to said timestamp to determine said latency information.

* * * * *